United States Patent
Abe et al.

(10) Patent No.: US 12,540,369 B2
(45) Date of Patent: Feb. 3, 2026

(54) METHOD FOR RECOVERING LITHIUM

(71) Applicant: KANTO DENKA KOGYO CO., LTD., Tokyo (JP)

(72) Inventors: Takuro Abe, Kurashiki (JP); Yusuke Suzuki, Kurashiki (JP); Shinsuke Katayama, Kurashiki (JP)

(73) Assignee: KANTO DENKA KOGYO CO., LTD., Tokyo (JP)

( * ) Notice: Subject to any disclaimer, the term of this patent is extended or adjusted under 35 U.S.C. 154(b) by 412 days.

(21) Appl. No.: 18/019,027

(22) PCT Filed: Oct. 18, 2021

(86) PCT No.: PCT/JP2021/038461
§ 371 (c)(1),
(2) Date: Jan. 31, 2023

(87) PCT Pub. No.: WO2022/085635
PCT Pub. Date: Apr. 28, 2022

(65) Prior Publication Data
US 2023/0279521 A1    Sep. 7, 2023

(30) Foreign Application Priority Data
Oct. 19, 2020 (JP) ................... 2020-175537

(51) Int. Cl.
C22B 26/12 (2006.01)
C22B 1/02 (2006.01)
C22B 3/08 (2006.01)
H01M 10/54 (2006.01)

(52) U.S. Cl.
CPC .............. C22B 26/12 (2013.01); C22B 1/02 (2013.01); C22B 3/08 (2013.01); H01M 10/54 (2013.01)

(58) Field of Classification Search
CPC .. C22B 26/12; C22B 1/02; C22B 3/08; C22B 3/44; C22B 7/007; C22B 7/00; H01M 10/54; Y02P 10/20; Y02W 30/84
See application file for complete search history.

(56) References Cited

U.S. PATENT DOCUMENTS

| | | |
|---|---|---|
| 6,524,737 B1 | 2/2003 | Tanii et al. |
| 2016/0049699 A1* | 2/2016 | Hayashi ................ C01F 11/22 423/178 |
| 2017/0022068 A1* | 1/2017 | Rodriguez ............... C22B 3/06 |
| 2019/0152793 A1 | 5/2019 | Liu et al. |
| 2020/0078796 A1 | 3/2020 | Kochhar et al. |

FOREIGN PATENT DOCUMENTS

| | | | |
|---|---|---|---|
| CN | 102041380 | | 5/2011 |
| CN | 104628217 A | | 5/2015 |
| CN | 110498433 | | 11/2019 |
| CN | 110616331 A | * | 12/2019 ............. C22B 26/12 |
| CN | 110767954 A | | 2/2020 |
| CN | 110783658 A | | 2/2020 |
| CN | 110945711 A | | 3/2020 |
| EP | 3202928 A1 | | 8/2017 |
| JP | 2000106221 A | | 4/2000 |
| JP | 3722998 B2 | | 11/2005 |
| JP | 2012-41621 | | 9/2013 |
| JP | 2014156648 A | * | 8/2014 |
| JP | 2017-537221 | | 12/2017 |
| JP | 2019-160429 | | 9/2019 |
| KR | 20170063786 A | | 6/2017 |
| WO | 2000/019557 | | 4/2000 |

OTHER PUBLICATIONS

International Search Report for PCT/JP2021/038461, mailed Nov. 16, 2021, 4 pages.
Written Opinion of the ISA for PCT/JP2021/038461, mailed Nov. 16, 2021, 4 pages.
Extended European Search Report, issued in European Patent Application No. 21882776.4 dated Jun. 17, 2025.
Office Action and Search Report, issued in Chinese Patent Application No. 202180065529 dated Nov. 1, 2025.
Office Action, issued in Korean Patent Application No. 10-2023-7011623 dated Dec. 11, 2025.

* cited by examiner

Primary Examiner — Anthony J Zimmer
(74) Attorney, Agent, or Firm — NIXON & VANDERHYE

(57) ABSTRACT

Provided is a method for recovering lithium from a material containing fluorine and lithium. The method includes: mixing the material with an aqueous sulfuric acid solution or water to prepare a mixed liquid; and mixing the mixed liquid with a slightly or sparingly soluble calcium-containing alkaline agent to form a precipitate containing fluorine and calcium, followed by solid-liquid separation to obtain a purified solution having lithium dissolved therein. In the preparation of the a mixed liquid, the material and the sulfuric acid aqueous solution or water are mixed and heated at 60° to 90° C.

18 Claims, No Drawings

METHOD FOR RECOVERING LITHIUM

This application is the U.S. national phase of International Application No. PCT/JP2021/038461 filed Oct. 18, 2021, which designated the U.S. and claims priority to JP Patent Application No. 2020-175537 filed Oct. 19, 2020, the entire contents of each of which are hereby incorporated by reference.

TECHNICAL FIELD

This invention relates to a method for recovering lithium from materials containing fluorine and lithium.

BACKGROUND ART

Lithium compounds are used in a variety of applications, including additives for glass, fluxes for casting steel and iron, refrigerant/absorbents for large-sized air conditioning equipment, and catalysts for synthetic rubber production.

In recent years, there has been an increasing demand for lithium-ion secondary batteries with increased energy density and excellent fast-charging characteristics.

Lithium-ion secondary batteries have found wide use in various types of equipment, including small communication terminals, such as smartphones; relatively small electronic/electric devices, such as notebook computers, electric tools, and wireless LAN repeaters; and large equipment, such as hybrid vehicles, electric vehicles, household storage batteries, solar power storage facilities, and emergency storage batteries.

To meet the demand, various lithium compounds are being produced, and accordingly, there is a diversity of lithium-containing waste.

"Lithium-containing waste" means waste solids, waste water, and in-process rejects generated from the production of the starting lithium compounds to the manufacture of lithium-containing products and equipment. Lithium-containing waste also includes lithium-containing products and equipment that are disposed of due to deterioration over time or after replacement or upgrading.

Such waste generated from manufacturing or due to replacement or upgrading has been a cause of environmental pollution. In view of effective utilization of resources and environmental pollution problems, recovery of valuable components from various materials including waste solids and waste water has been under study.

Lithium recovery from the waste is generally carried out by a method including extracting lithium with water or an acid and then reducing impurities by, for example, extraction with organic solvents, neutralization, and salt exchange.

However, in the case where lithium is recovered from fluorine-containing waste, lithium fluoride, which is water-insoluble, generates in various processes involved, to thereby hinder the lithium recovery.

Conventional methods for recovering lithium from waste in the presence of fluorine are disclosed in patent literatures 1 to 3 listed below. The method disclosed in patent literature 1 includes adding an alkali to a lithium-containing discharging solution and/or lithium-containing washing water from the respective processes involved in the recovery of valuable metals from lithium-ion batteries, contacting the discharging solution and/or the washing water with an acidic extracting solvent at a pH of 9 or less at a temperature of 0° to 25° C. to extract lithium ions, and contacting the acidic extracting solvent containing extracted lithium ions with an acidic solution of pH 3 or less to back-extract lithium ions.

Patent literature 2 discloses a method for recovering lithium, and the method includes: step a of pulping by stirring crude lithium fluoride into a pulp, and adding an acid to prepare a crude lithium fluoride pulp; and the step of adding the crude lithium fluoride pulp obtained in the step a into a boiling calcium chloride solution, and then adding an alkaline substance to prepare a lithium chloride solution.

Patent literature 3 discloses a method of preparing a solution containing lithium, the method comprising performing multistage countercurrent leaching on a lithium-containing solid raw material by using a calcium-containing acidic solution to obtain a solution containing lithium and a leaching residue by using trisodium phosphate.

CITATION LIST

Patent Literature

Patent literature 1: JP 2012-41621A
Patent literature 2: US 2019/0152793A1
Patent literature 3: CN 110498433

SUMMARY OF INVENTION

The method disclosed in patent literature 1 includes multistage solvent extraction under a low temperature condition for recovering lithium from a hexafluorophosphoric acid solution. However, this technique fails to recover lithium fluoride generated by hydrolysis. The multistage extraction process not only reduces lithium recovery efficiency but also involves generation of large quantities of solid and liquid waste, such as the spent organic solvent, which incur cost for disposal to result in increased cost for lithium recovery.

The method for recovering lithium from crude lithium fluoride according to literature 2 requires a number of chemicals, including an acid for dissolving lithium fluoride, calcium chloride, and a neutralizing agent. Because calcium chloride is easily soluble, the resulting lithium contains a considerable amount of calcium and thus needs re-purification.

The method disclosed in patent literature 3, a kind of method for preparing the solution containing lithium comprising: Multilevel counter-flow extraction is carried out to solid material containing lithium using calcic acid solution, and a tri-sodium phosphate is used to obtain a solution containing lithium and a leached slag.

Accordingly, an object of the invention is to provide a method for recovering lithium that does not require the use of organic extracting solvents, or in other words, has a low environmental impact, involves use of inexpensive materials, and enables highly efficient lithium recovery through a few processes.

The inventors have found that lithium can be recovered easily and efficiently by mixing a material containing fluorine and lithium with a sulfuric acid aqueous solution or water and then causing a slightly or sparingly soluble calcium-containing alkaline agent to react with the mixture.

Based on the above findings, the invention provides a method for recovering lithium from a material containing fluorine and lithium (hereinafter, F,Li-containing material), the methods including: mixing the F,Li-containing material with an aqueous sulfuric acid solution or water to prepare a mixed liquid; and mixing the mixed liquid with a slightly or sparingly soluble calcium-containing alkaline agent to form a precipitate containing fluorine and calcium, followed by solid-liquid separation to obtain a purified solution having lithium dissolved therein.

DESCRIPTION OF EMBODIMENTS

The invention will be described on the basis of its preferred embodiments. The invention relates to a method for recovering lithium from an F,Li-containing material, including: mixing the material with an aqueous sulfuric acid solution or water to prepare a mixed liquid (step 1); and mixing the mixed liquid with a slightly or sparingly soluble calcium-containing alkaline agent to form a precipitate containing fluorine and calcium, followed by solid-liquid separation to obtain a purified solution having lithium dissolved therein (step 2).

The F,Li-containing material for use in the invention may be either solid or liquid. The solid material may be in a dispersed state in a solvent, such as water.

The F,Li-containing material is exemplified by waste lithium-ion secondary battery scrap and roasted waste lithium-ion secondary battery scrap, as well as solid industrial waste and liquid industrial waste, such as plant effluent.

The form of the fluorine and lithium in the material may be, but is not limited to, a salt containing both elemental fluorine and elemental lithium, or a mixture of a fluorine-containing substance and a lithium-containing substance.

Examples of the salt containing both elemental fluorine and elemental lithium include, but are not limited to, a fluoride, fluorophosphate, fluorosulfonate, fluoroborate, and fluorosulfonylimide of lithium. The fluoride of lithium is lithium fluoride. Examples of the fluorophosphate of lithium include lithium monofluorophosphate, lithium difluorophosphate, lithium methyl monofluorophosphate, and lithium hexafluorophosphate. Examples of the fluorosulfonate of lithium include lithium trifluoromethanesulfonate and lithium nonafluorobutanesulfonate. Examples of the lithium fluoroborate include lithium tetrafluoroborate. Examples of the lithium fluorosulfonylimide include lithium bis(fluorosulfonyl)imide. These salts may be used either individually or in the form of mixture of two or more thereof.

The mixture of a fluorine-containing substance and a lithium-containing substance is not particularly limited. Examples of the fluorine-containing substance of the mixture include alkali metal fluorides, alkaline earth metal fluorides, and hydrofluoric acid. Examples of the lithium-containing substance of the mixture include lithium halides, lithium oxide, lithium hydroxide, lithium phosphate, lithium borate, lithium sulfate, and lithium nitrate.

The F,Li-containing material, which is to be mixed with an aqueous sulfuric acid solution or water, may previously have undergone a chemical or physical treatment but is preferably as obtained without being subjected to a process of removing sediment. Because sediment may contain lithium, removal of the sediment before the reaction with a slightly or sparingly soluble calcium-containing alkaline agent can reduce the efficiency of lithium recovery.

The lithium content of the F,Li-containing material is not limited, but is preferably at least 100 ppm by mass, more preferably 1000 ppm or higher in terms of productivity. The upper limit of the lithium content is not limited, but the lithium content is usually 30 mass % or less.

In the case where the F,Li-containing material is solid or in a dispersed state, the lithium content of the F,Li-containing material can be determined by dissolving the solid or the dispersion in a mineral acid and analyzing the chemical composition of the resulting sample solution by ICP atomic emission spectrometry (ICP-AES). When the F,Li-containing material is liquid, it is directly analyzed by ICP-AES to determine the lithium content thereof.

The fluorine content of the F,Li-containing material is not limited; however, the mass ratio of fluorine to lithium, F/Li, of the F,L-containing material is preferably 0.1 or higher in view of the effective application of the invention, and preferably 30 or lower, more preferably 20 or lower in view of productivity.

The fluorine content can be determined through any known method, including ion chromatography, lanthanum-alizarin complexone absorptiometry, and energy dispersive X-ray spectroscopy, and the method may be selected according to the form of the material.

Step 1:

In the present invention, the F,Li-containing material is mixed with an aqueous sulfuric acid solution or water. The amount of the aqueous sulfuric acid solution or water to be used is preferably 20 to 10000 times, more preferably 30 to 2000 times, even more preferably 50 to 300 times, the mass of lithium present in the F,Li-containing material, in terms of lithium recovery efficiency and productivity.

The concentration of the aqueous sulfuric acid solution is not limited, but the sulfuric acid concentration is preferably 90 mass % or less, more preferably 80 mass % or less, in terms of productivity and ease of handling.

The contact between the F,Li-containing material and an aqueous sulfuric acid solution or water is preferably carried out under heating in view of efficiency of lithium recovery. From this viewpoint, the temperature of the mixture of the F,Li-containing material and the aqueous sulfuric acid solution or water is preferably room temperature to 300° C. In view of energy cost, it is more preferably 30° to 150° C., even more preferably 60° to 90° C. The mixing of the F,Li-containing material and an aqueous sulfuric acid solution or water may be under pressure or atmospheric pressure.

Providing that the temperature of the contact between the F,Li-containing material and an aqueous sulfuric acid solution or water is in the above range, the contacting time is preferably 10 minutes to 5 hours, more preferably 10 minutes to 3 hours, in terms of working efficiency and lithium recovery efficiency.

The mixed liquid resulting from mixing the F,Li-containing material and an aqueous sulfuric acid solution or water is such that at least part of each of the fluorine and lithium that has been contained in the F,Li-containing material is dissolved in the aqueous sulfuric acid solution or water. The mixed liquid may have solids or be all liquid. From the standpoint of extraction efficiency, the solids content of the mixed liquid is preferably 30 mass % or less, more preferably 10 mass % or less. As used herein, the term "solids content" refers to the amount measured at 25° C. under atmospheric pressure. In the subsequent step 2, the mixed liquid may be directly mixed with a slightly or sparingly soluble calcium-containing alkaline agent. Where needed, the mixed liquid may be subjected to solid-liquid separation so that only the liquid phase may be subjected to step 2.

Step 2:

The mixed liquid obtained in step 1 is then mixed with a slightly or sparingly soluble calcium-containing alkaline agent. As used herein, the term "slightly or sparingly soluble calcium-containing alkaline agent" is intended to mean that the alkaline agent preferably has a solubility of 5 g or less, more preferably 1 g or less, in 100 ml of water at 25° C. under atmospheric pressure. Specific examples of such a calcium-containing alkaline agent include calcium oxide, calcium hydroxide, and calcium carbonate. Calcium hydroxide is especially preferred of them in terms of ease of handling and efficiency of fluorine removal. On mixing the mixed liquid with the slightly or sparingly soluble calcium-containing alkaline agent, a precipitate containing fluorine and calcium is formed.

The slightly or sparingly soluble calcium-containing alkaline agent preferably has an average particle size of 1 to 1400 μm, more preferably 1 to 50 μm, even more preferably 5 to 20 μm. The average particle size can be determined by, for example, the laser diffraction method (volume-weighted DSO) or image analysis using, e.g., SEM (maximum Feret's diameter). It is preferred that the average particle size be within the above range when determined by the laser diffraction method.

In the present invention, the slightly or sparingly soluble calcium-containing alkaline agent is actively mixed with the mixed liquid. Therefore, even when calcium chloride and a strong base, such as sodium hydroxide, are present in the mixed liquid to form calcium hydroxide, such calcium hydroxide is not considered the alkaline agent in the present invention. Note that the mixed liquid obtained in step 1 should not be brought into contact with calcium chloride even if together with the slightly or sparingly soluble calcium-containing alkaline agent. This is because calcium chloride, which is water-soluble, would be incorporated into a purified solution to be obtained in step 2. For example, if lithium carbonate is prepared from such a purified solution, the calcium will be present in the resulting lithium carbonate, reducing the purity of the lithium carbonate.

The slightly or sparingly soluble calcium-containing alkaline agent as it is may be mixed with the mixed liquid. Alternatively, the slightly or sparingly soluble calcium-containing alkaline agent may be added to and dispersed in water, and then the dispersion may be mixed with the mixed liquid.

The amount of the slightly or sparingly soluble calcium-containing alkaline agent to be used in the invention varies according to the amount of fluorine in the mixed liquid. For example, in view of reaction efficiency and handling properties, the amount of the slightly or sparingly soluble calcium-containing alkaline agent is preferably such that the amount of elemental calcium is from 0.1 to 20 mols, more preferably 0.3 to 15 mols, per mole of elemental fluorine present in the mixed liquid.

The mixing of the mixed liquid from step 1 with the slightly or sparingly soluble calcium-containing alkaline agent may be performed at room temperature, but it is preferred to heat the mixture of the mixed liquid and the alkaline agent in terms of reaction efficiency between fluorine in the solution and the alkaline agent. The temperature of the heating of the mixture is preferably 30° C. or higher for reaction efficiency and 300° C. or lower in terms of energy efficiency. Heating at temperatures above 300° C. does not increase the reaction efficiency any more. From these considerations, the heating temperature preferably ranges from 50° to 200° C., more preferably from 60° to 90° C. The mixing of the mixed liquid with the slightly or sparingly soluble calcium-containing alkaline agent may be conducted under atmospheric pressure or under pressure.

The mixture of the slightly or sparingly soluble calcium-containing alkaline agent and the mixed liquid preferably has a pH of 3 or more at the temperature of the mixture with a view to accelerating the formation of a precipitate containing fluorine and calcium and a pH of 14 or less with a view to preventing lithium precipitation. From these considerations, the pH preferably ranges from 5 to 12, more preferably from 10 to 12.

The precipitate formed in step 2 is removed by solid-liquid separation. Thus, the liquid phase can be obtained as a purified solution having a lithium compound dissolved therein.

The purified solution thus obtained can find various uses. For example, it can be contacted with a carbonate or carbon dioxide to form a carbonate of lithium in the purified solution.

As described, the method of the invention enables recovering lithium through a few steps at high efficiency from F,Li-containing materials from which it is difficult to recover lithium, such as water-insoluble lithium fluoride. A compound that contains fluorine and lithium and is easily hydrolyzed to produce lithium fluoride, such as lithium hexafluorophosphate, is present in waste materials, including waste lithium-ion secondary batteries. A mixture of a lithium-containing compound and a fluorine-containing compound may cause a reaction to form lithium fluoride. The invention allows for recovery of lithium from such a compound and a mixture with ease and high efficiency and has tremendous industrial applicability.

Steps 1 and 2 of the invention need no use of organic solvents. It is desirable that an organic solvent should be actively added to neither the mixed liquid of the F,Li-containing material with an aqueous sulfuric acid solution or water obtained in step 1 nor the mixture of the mixed liquid and a slightly or sparingly soluble calcium-containing alkaline agent in step 2. Addition of an organic solvent will only increase the cost of waste liquid disposal.

EXAMPLE

The invention will now be illustrated by way of Examples, but it should be understood that the invention is not limited thereto. Calcium hydroxide used in Examples had an average particle size of 5 to 10 μm. Unless otherwise specified, all the percentages are by mass.

Example 1

Lithium fluoride powder was used as an F,Li-containing material. To 68.6 g of a 30% sulfuric acid aqueous solution was added 3.7 g of lithium fluoride powder, and the mixture was heated at 70° C. under atmospheric pressure for 3 hours to prepare a mixed liquid. The mixed liquid was maintained at 70° C. under atmospheric pressure, and 200 g of a 5% calcium hydroxide aqueous suspension was added thereto to adjust the pH of the resulting mixed liquid to 12 at that temperature. The insoluble impurity precipitated in the mixed liquid was removed by solid-liquid separation by filtration, to collect the liquid phase as a purified solution. The lithium content of the purified solution was determined through chemical composition analysis by ICP-AES. The lithium recovery as calculated from the lithium content is shown in Table 1.

Example 2

Lithium hexafluorophosphate powder was used as an F,Li-containing material. To 59.2 g of a 15% sulfuric acid aqueous solution was added 22 g of lithium hexafluorophosphate powder, and the mixture was heated at 70° C. under atmospheric pressure for 3 hours to prepare a mixed liquid. The mixed liquid was maintained at 70° C. under atmospheric pressure, and 191 g of a 45% calcium hydroxide aqueous suspension was added thereto to adjust the pH of the resulting mixed liquid to 12 at that temperature. The insoluble impurity precipitated in the mixed liquid was removed by solid-liquid separation by filtration, to collect the liquid phase as a purified solution. The lithium content of the purified solution was determined through chemical composition analysis by ICP-AES. The lithium recovery as calculated from the lithium content is shown in Table 1.

Example 3

Lithium difluorophosphate powder was used as an F,Li-containing material. To 49.9 g of water was added 15.5 g of lithium difluorophosphate powder, and the mixture was heated at 70° C. under atmospheric pressure for 10 minutes to prepare a mixed liquid. The mixed liquid was maintained at 70° C. under atmospheric pressure, and 154 g of a 10% calcium hydroxide aqueous suspension was added thereto to adjust the pH of the resulting mixed liquid to 11 at that temperature. The insoluble impurity precipitated in the mixed liquid was removed by solid-liquid separation by filtration, to collect the liquid phase as a purified solution. The lithium content of the purified solution was determined through chemical composition analysis by ICP-AES. The lithium recovery as calculated from the lithium content is shown in Table 1.

Example 4

A 50% lithium bis(fluorosulfonyl)imide aqueous solution was used as an F,Li-containing material. To 6.9 g of a 30% sulfuric acid aqueous solution was added 10 g of the lithium bis(fluorosulfonyl)imide solution, and the mixture was heated at 70° C. under atmospheric pressure for 3 hours to prepare a mixed solution. The mixed solution was maintained at 70° C. under atmospheric pressure, and 41 g of a 5% calcium hydroxide aqueous suspension was added thereto to adjust the pH of the resulting mixed liquid to 12 at that temperature. The insoluble impurity precipitated in the mixed liquid was removed by solid-liquid separation by filtration, to collect the liquid phase as a purified solution. The lithium content of the purified solution was determined through chemical composition analysis by ICP-AES. The lithium recovery as calculated from the lithium content is shown in Table 1.

Example 5

Roasted lithium-ion battery scrap containing 2.7% of lithium, mainly in the form of lithium oxide, in terms of elemental lithium and 5.7% of fluorine, mainly in the form of calcium fluoride, in terms of elemental fluorine was used as an F,Li-containing material. To 24.9 g of a 40% sulfuric acid aqueous solution was added 6 g of the roasted scrap, and the mixture was heated at 70° C. under atmospheric pressure for 3 hours to prepare a mixed solution. The mixed solution was maintained at 70° C. under atmospheric pressure, and 260 g of a 5% calcium hydroxide aqueous suspension was added thereto to adjust the pH of the resulting mixed liquid to 10 at that temperature. The insoluble impurity precipitated in the mixed liquid was removed by solid-liquid separation by filtration, to collect the liquid phase as a purified solution. The lithium content of the purified solution was determined through chemical composition analysis by ICP-AES. The lithium recovery as calculated from the lithium content is shown in Table 1.

TABLE 1

| | F, Li-containing Material | Li Content of F, Li-containing Material (g) | F Content of F, Li-containing Material (g) | Li Content of Purified Solution (g) | Li Recovery (%) |
|---|---|---|---|---|---|
| Example 1 | Lithium fluoride | 1.0 | 2.7 | 0.8 | 76 |
| Example 2 | Lithium hexafluorophosphate | 1.0 | 16.5 | 0.7 | 65 |
| Example 3 | Lithium difluorophosphate | 1.0 | 5.5 | 0.6 | 62 |
| Example 4 | Lithium bis(fluorosulfonyl)imide | 0.2 | 1.0 | 0.1 | 68 |
| Example 5 | Roasted LIB* Particles | 0.2 | 0.3 | 0.1 | 66 |

LIB: Lithium-ion secondary battery

As is shown in Table 1, the invention allows for achieving a high lithium recovery from inexpensive materials through a few steps.

INDUSTRIAL APPLICABILITY

According to the invention, lithium can be recovered efficiently through a few steps from an F,Li-containing material from which it has been difficult to recover lithium. The method of the invention has a low environmental impact because it does not need the use of organic extracting solvents, and allows for the use of inexpensive materials.

The invention claimed is:

1. A method for recovering lithium from a material containing fluorine and lithium, comprising:
   mixing the material with an aqueous sulfuric acid solution or water to prepare a mixed liquid, and
   mixing the mixed liquid with a slightly or sparingly soluble calcium-containing alkaline agent such that the resulting mixture has a pH of 10 to 14 to form a precipitate containing fluorine and calcium, followed by solid-liquid separation to obtain a purified solution having lithium dissolved therein.

2. The method according to claim 1, wherein in preparation of the mixed liquid, the material and the aqueous sulfuric acid solution or water are mixed and heated at 60° to 90° C.

3. The method according to claim 1, wherein the material comprises roasted lithium-ion secondary battery scrap in a form of a solid or waste water containing fluorine and lithium.

4. The method according to claim 1, wherein the material comprises at least one of a fluoride of lithium, a fluorophosphate of lithium, a fluorosulfonate of lithium, a fluoroborate of lithium, and a fluorosulfonylimide of lithium.

5. The method according to claim 1, wherein the slightly or sparingly soluble calcium-containing alkaline agent is calcium oxide, calcium hydroxide, or calcium carbonate.

6. The method according to claim 1, wherein the mixing of the mixed liquid with the slightly or sparingly soluble calcium-containing alkaline agent is carried out such that the resulting mixture has a pH of 10 to 12, to form a precipitate containing fluorine and calcium.

7. The method according to claim 6, wherein the mixing of the mixed liquid with the slightly or sparingly soluble calcium-containing alkaline agent is carried out such that the resulting mixture has a temperature of 60° to 90° C. and a pH of 10 to 12.

8. The method according to claim 2, wherein the material comprises roasted lithium-ion secondary battery scrap in a form of a solid or waste water containing fluorine and lithium.

9. The method according to claim 2, wherein the material comprises at least one of a fluoride of lithium, a fluorophosphate of lithium, a fluorosulfonate of lithium, a fluoroborate of lithium, and a fluorosulfonylimide of lithium.

10. The method according to claim 3, wherein the material comprises at least one of a fluoride of lithium, a fluorophosphate of lithium, a fluorosulfonate of lithium, a fluoroborate of lithium, and a fluorosulfonylimide of lithium.

11. The method according to claim 8, wherein the material comprises at least one of a fluoride of lithium, a fluorophosphate of lithium, a fluorosulfonate of lithium, a fluoroborate of lithium, and a fluorosulfonylimide of lithium.

12. The method according to claim 2, wherein the slightly or sparingly soluble calcium-containing alkaline agent is calcium oxide, calcium hydroxide, or calcium carbonate.

13. The method according to claim 3, wherein the slightly or sparingly soluble calcium-containing alkaline agent is calcium oxide, calcium hydroxide, or calcium carbonate.

14. The method according to claim 4, wherein the soluble calcium-slightly or sparingly containing alkaline agent is calcium oxide, calcium hydroxide, or calcium carbonate.

15. The method according to claim 8, wherein the slightly or sparingly soluble calcium-containing alkaline agent is calcium oxide, calcium hydroxide, or calcium carbonate.

16. The method according to claim 9, wherein the slightly or sparingly soluble calcium-containing alkaline agent is calcium oxide, calcium hydroxide, or calcium carbonate.

17. The method according to claim 10, wherein the slightly or sparingly soluble calcium-containing alkaline agent is calcium oxide, calcium hydroxide, or calcium carbonate.

18. The method according to claim 1, wherein the slightly or sparingly soluble calcium-containing alkaline agent has an average particle size of 1 to 50 μm.

* * * * *